No. 670,465. Patented Mar. 26, 1901.
W. v. BAUMBACH.
SETTING FOR TILE.
(Application filed Nov. 24, 1900.)

(No Model.)

WITNESSES:
Lew. E. Curtis
H. W. Munday

INVENTOR:
WILLIAM V. BAUMBACH
By Munday, Evarts & Adcock
HIS ATTORNEYS.

THE NORRIS PETERS CO., PHOTO-LITHO., WASHINGTON, D. C.

UNITED STATES PATENT OFFICE.

WILLIAM V. BAUMBACH, OF MILWAUKEE, WISCONSIN.

SETTING FOR TILE.

SPECIFICATION forming part of Letters Patent No. 670,465, dated March 26, 1901.

Application filed November 24, 1900. Serial No. 37,633. (No specimens.)

*To all whom it may concern:*

Be it known that I, WILLIAM V. BAUMBACH, a citizen of the United States, residing in Milwaukee, in the county of Milwaukee and State of Wisconsin, have invented a new and useful Improvement in Settings for Tile, of which the following is a specification.

Tile-setters have long been seeking a suitable material other than cement in which tile may be laid over a wood floor. Where cement is used for this purpose, it must be quite thick, some six or seven inches ordinarily, in order to prevent it from breaking or disintegrating, and by reason of its great thickness in cases where it is applied to an already-existing floor the floor must generally be lowered, and in all cases it is very heavy and expensive as well as seriously objectionable, because of its friable nature and its liability to crack when drying and when undergoing changes of temperature. Up to the time of my invention no available substitute for cement has been found; but by many tests and experiments I have discovered that the material composed of a solution of chlorid of magnesia, magnesite, and sawdust and now in extensive use and known commercially as "monolith" and its equivalents will answer the purpose admirably and that it makes a better setting for tile than cement. It does not shrink in drying and is elastic, so that the tile laid in it are permitted to yield slightly under the weight of persons walking over them; but this yielding does not loosen them or affect the hold of the monolith upon them. It is very tenacious and will neither crack nor flake off. A thin layer of the monolith—say one-half an inch in thickness—is sufficient for a setting for tile in ordinary cases, so that by using it I avoid the greater part of the excessive weight and a large part of the cost of the cement setting, and I also avoid in a majority of cases the necessity of lowering the floor to bring the tile to the proper level. The small amount requisite as compared with cement specially adapts the monolith also to use in the preparation of tile slabs and panels used specially in wainscoting, mantels, &c., and in which the tile are set at the factory instead of the place where they are to be used and are transported frequently as freight. In the making of repairs also the new and the old monolith unite more perfectly than do the new and old cement in the repairs of tilework set in the old way.

Figure 1:
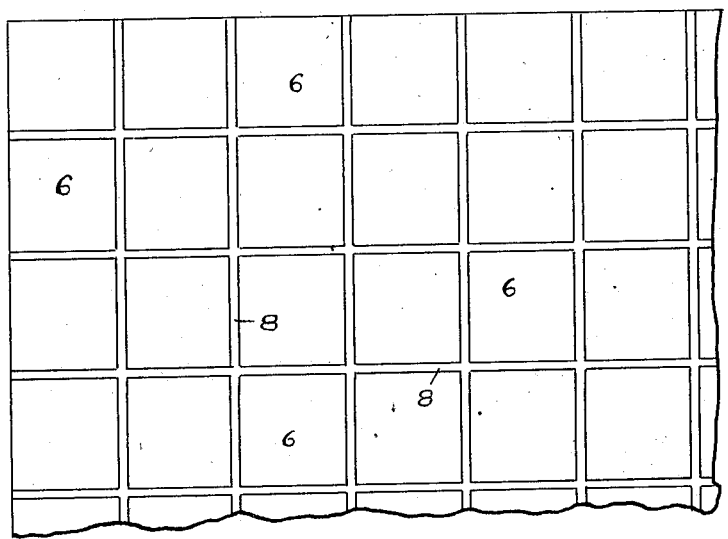
Figure 2:
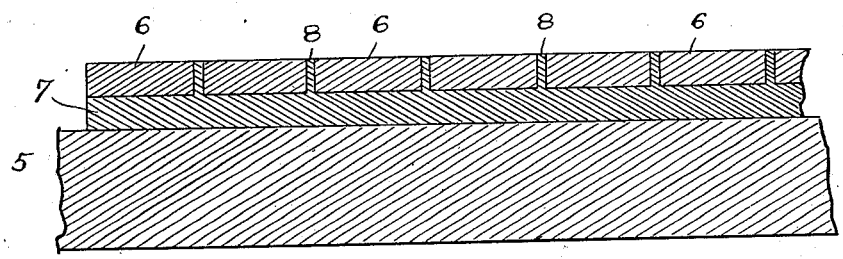

In the accompanying drawings I show at Figure 1 a plan view of a portion of a tile-covered wood floor embodying my invention. Fig. 2 is a vertical section of the same.

In said drawings, 5 represents the wood floor, and 6 6 represent a series of tile laid in a layer of monolith 7, spread over the wood floor. This layer need not ordinarily exceed one-half inch in thickness, and the tile are embedded therein while it is soft in the manner in which they have heretofore been embedded in the cement. Those portions of the monolith which enter between the tile, as at 8, bind the tile together and to the body of the monolith, and the body adheres firmly to the wood floor.

In the manufacture of tile panels the monolith is adapted not only to act as a setting for the tile, but it renders any other backing unnecessary, and screws and nails can be forced into or through it as with wood, and thus render it easy to secure the panel in place.

In addition to the elasticity, freedom from shrinkage, non-friable character, and other desirable qualities possessed by the setting material used by me may be mentioned the firmness with which it holds the tile. This is largely due, as I believe, to the fact that the portions of it which enter between the tile do not break and crumble into dust by reason of the moving of the tile under the weight of people stepping upon them, as do the like portions of cement settings, but retain both their form and their holding ability indefinitely.

In the manufacture of the monolith the ingredients mentioned are used generally in about the proportions of thirty-two ounces of the solution to about sixteen ounces of the magnesite and from ten to sixteen ounces of the sawdust. These proportions can be, however, and are considerably varied, according to the requirements of the work in hand.

I claim—

The combination of the tile and a setting therefor composed of commercial monolith or similar material, substantially as specified.

WILLIAM V. BAUMBACH.

Witnesses:
H. M. MUNDAY,
EDW. S. EVARTS.